United States Patent [19]
Ishii et al.

[11] Patent Number: 5,339,935
[45] Date of Patent: Aug. 23, 1994

[54] CONTROL SYSTEM FOR TORQUE CONVERTER

[75] Inventors: Kozo Ishii; Kazuo Takemoto; Takuji Fujiwara; Tatsutoshi Mizobe, all of Hiroshima; Fumiaki Baba, Higashi-Hiroshima; Shigeru Nagayama; Osamu Watanabe, both of Hiroshima; Koichiro Takeuchi, Hatsuaichi, all of Japan

[73] Assignee: Mazda Motor Corporation, Hiroshima, Japan

[21] Appl. No.: 928,165

[22] Filed: Aug. 13, 1992

Related U.S. Application Data

[63] Continuation of Ser. No. 685,812, Apr. 16, 1991, abandoned.

[30] Foreign Application Priority Data

| Apr. 18, 1990 | [JP] | Japan | 2-103995 |
| Apr. 19, 1990 | [JP] | Japan | 2-104216 |
| Sep. 28, 1990 | [JP] | Japan | 2-261396 |

[51] Int. Cl.$^5$ .................................. F16H 45/02
[52] U.S. Cl. .................................. 192/3.3; 475/65
[58] Field of Search ............... 192/3.29, 3.3; 475/65; 74/890

[56] References Cited

U.S. PATENT DOCUMENTS

| 2,728,427 | 12/1955 | Lucia | 192/0.033 |
| 4,618,036 | 10/1986 | Ideta | 192/3.3 |
| 4,880,090 | 11/1989 | Ando | 193/3.3 |
| 4,989,702 | 2/1991 | Yoshimura et al. | 192/3.29 |
| 5,010,990 | 4/1991 | Yoshimura et al. | 192/3.3 |

FOREIGN PATENT DOCUMENTS

| 367551 | 5/1990 | European Pat. Off. . |
| 62-297567 | 12/1987 | Japan . |
| 2191833 | 12/1987 | United Kingdom . |

*Primary Examiner*—Rodney H. Bonck
*Attorney, Agent, or Firm*—Keck, Mahin & Cate

[57] ABSTRACT

A control system for a torque converter includes a lock-up clutch provided in the torque converter for connecting input and output members of the torque converter directly, and a shift valve having first and second spools disposed in series in a sleeve for shifting an introduction of an engaging and releasing pressure acting on the lock-up clutch in accordance with positions of the first and second spools. The first spool is subjected to a first hydraulic pressure at one end thereof. The second spool is subjected to a second hydraulic pressure at one end thereof opposite to the one end of the first spool. The first and second spools are subjected to a third hydraulic pressure therebetween. The control system further has a first control device for controlling the first hydraulic pressure, and an adjusting valve for controlling the releasing pressure of the lock-up clutch. The shift valve provides the first and second spools with first, second and third positions corresponding to a converter condition, lock-up condition and slip condition, respectively. The shift valve is shifted between the second and third positions when the releasing pressure is relatively low so that the releasing pressure is continuously changed irrespective of the shifting action among the first, second and third positions of the shift valve. An abrupt change in the engaging force of the lock-up clutch is prevented.

29 Claims, 11 Drawing Sheets

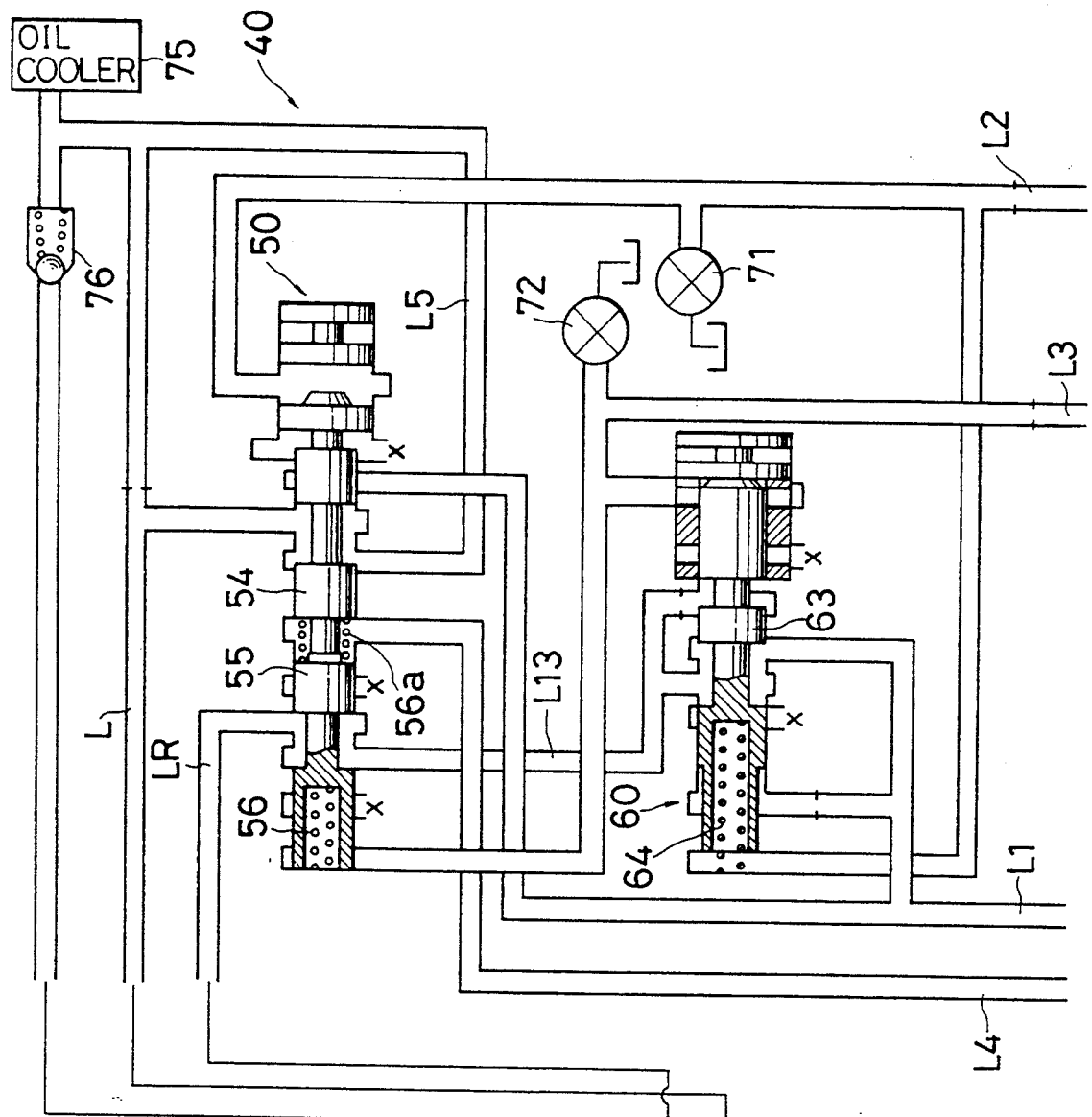
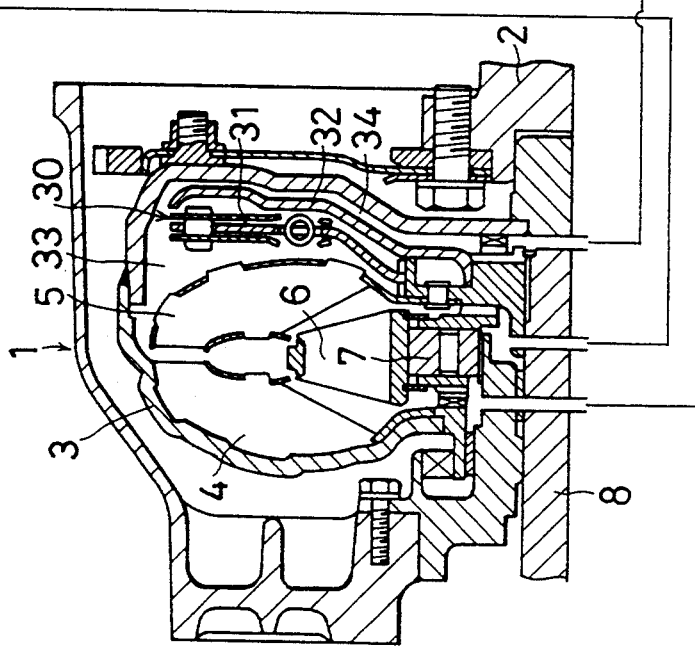
FIG.12

CONTROL SYSTEM FOR TORQUE CONVERTER

This is a continuation of application Ser. No. 07/685,812, filed Apr. 16, 1991, now abandoned.

BACKGROUND OF THE INVENTION

1. Field of the Invention

The present invention relates to a torque converter control system having a lock-up clutch.

2. Description of the Prior Art

Generally, an automatic transmission is provided with a torque converter for amplifying an engine torque. The torque converter hydraulically amplifies the engine torque as well as transmits it. In the field of a torque converter incorporated into an automatic transmission of a vehicle, it has been proposed to provide a lock-up clutch for connecting directly an engine output member with an input member of the automatic transmission when the vehicle is in a certain vehicle operating condition.

Japanese Patent Public Disclosure (Kokai) No. 62-297567, laid open to the public on Dec. 24, 1987, discloses a control system for the torque converter having a lock-up clutch provided with a converter cover connected with an engine output shaft and a damper piston connected with a turbine shaft with the damper piston being brought into frictional engagement with the converter cover in accordance with a hydraulic pressure introduced into hydraulic chambers formed at front and back sides of the damper piston. The torque converter selectively provides a torque converter condition wherein the engine torque is hydraulically transmitted only through the torque converter, a lock-up condition wherein the engine torque is mechanically transmitted through only the lock-up clutch, and a slip condition wherein the engine torque is transmitted through both the lock-up clutch and the torque converter. Under the slip condition, the hydraulic pressure to the hydraulic chamber is controlled to accomplish a target slip rate between the converter cover and the damper piston.

This system disadvantageously necessitates various devices, such as a pressure regulator, control valve, gate valves, air bleed valves and check valves which complicate the structure thereof.

In view of the above, U.S. Pat. No. 4,989,702 discloses a simplified and compact control system of hydraulic pressure for the torque converter including a shift valve provided with a pair of juxtaposed spools taking three different positions in correspondence with the converter condition, lock-up condition, and slip condition respectively.

It should be however noted that the hydraulic control system disclosed in the U.S. Pat. No. 4,989,702 is disadvantageous in that the hydraulic pressure in the chambers of the torque converter may change abruptly and thus it is difficult to accomplish a smooth transition among the slip condition, converter condition and lock-up condition.

SUMMARY OF THE INVENTION

It is therefore an object of the present invention to provide a control system for a torque converter having a lock-up clutch which can smoothly change among the converter condition, lock-up condition and slip condition.

It is another object of the present invention to provide a hydraulic control system of a lock-up clutch of a simple structure.

It is further object of the present invention to provide a hydraulic control system of unique structure which can accomplish a smooth transition among the converter condition, lock-up condition and slip condition.

The above and other objects of the present invention can be accomplished by a control system for a torque converter comprising lock-up clutch means provided in said torque converter for connecting input and output members of the torque converter directly, shift valve means having first and second spools disposed in series in a sleeve for shifting an introduction of an engaging and releasing pressure acting on the lock-up clutch means in accordance with positions of the first and second spools, said first spool being subjected to a first hydraulic pressure at one end thereof, said second spool being subjected to a second hydraulic pressure at one end thereof opposite to the one end of the first spool, the first and second spools being subjected to a third hydraulic pressure therebetween, first control means for controlling said first hydraulic pressure, adjusting valve means for controlling said releasing pressure of the lock-up clutch means, said shift valve means providing the first and second spools with a first, second and third positions corresponding to a converter condition, lock-up condition and slip condition respectively, said shift valve means being shifted between the second and third positions when the releasing pressure is relatively low so that the releasing pressure is continuously changed irrespective of the shifting among said first, second and third positions on the shift valve means.

Preferably, the shift valve means takes the first position where both the first and second spools are offset at one end of the sleeve when the first hydraulic pressure is high and the second hydraulic pressure is high, the second position where both the first and second spools are offset at the other end of the sleeve when the first hydraulic pressure is low and the second hydraulic pressure is high, and the third position where the first hydraulic pressure is low and the second hydraulic pressure is intermediate.

In a feature of the present invention, the control system further comprises second control means for controlling said second hydraulic pressure. The third hydraulic pressure may be constant irrespective of the shifting of the position of the shift valve means.

The first control means is an on-off solenoid valve for switching the first hydraulic pressure between high and low.

The first hydraulic pressure is high when the on-off solenoid valve is off. The second control means is a duty solenoid valve for controlling the second hydraulic pressure continuously. In this case, the second hydraulic pressure preferably is increased as a duty ratio for the duty solenoid is decreased. The first position of the shift valve means is established when the duty ratio for the duty solenoid valve is smaller than about 20% and the on-off solenoid valve is off. The second position of the shift valve means is established when the duty ratio for the duty solenoid valve is smaller than about 20% and the on-off solenoid valve is on. The third position of the shift valve means is established when the duty ratio for the duty solenoid valve is greater than about 20% and the on-off solenoid valve is on.

Typically, the adjusting means comprises a spool in a sleeve which is moved between opposite ends of the sleeve in accordance with a change in a first control pressure and a second control pressure in opposition to the first control pressure so as to control the releasing pressure. In this structure, the spool of the adjusting valve means is subjected to the second hydraulic pressure as the first control pressure and to the first hydraulic pressure as the second control pressure. The adjusting valve means may comprise input and output ports through which the releasing pressure is introduced into the shift valve means. In this case, a communication between the input and output ports is changed in accordance with the movement of the spool to thereby change the releasing pressure continuously.

The releasing pressure produced by the adjusting valve means is increased as the first control pressure is decreased. A full communication is established between the input and output ports to maximize the releasing pressure when the first control pressure is small. The releasing pressure is decreased as the duty ratio of the duty solenoid valve is decreased in the case where the on-off solenoid is on. In this structure, a shift action occurs between the second and third positions when the releasing pressure is relatively low, the second hydraulic pressure is relatively high, and the duty ratio of the duty solenoid valve is relatively low.

In another feature of the present invention, the third hydraulic pressure is controlled by the second control means. In this structure, the second hydraulic pressure is substantially constant. The first control pressure is controlled by the duty solenoid valve. In this aspect of the present invention, the shift action occurs between the second and third positions when the releasing pressure is relatively low, the third hydraulic pressure is relatively low, and the duty ratio of the duty solenoid valve is relatively high.

In further aspect of the invention, the duty ratio is set at an extreme value providing the converter condition in the case where the lock-up condition is needed. The duty ratio is gradually reduced and the on-off solenoid valve is switched when the predetermined time period is passed after the extreme value is set.

According to the present invention, the shift valve means takes, selectively, the first position wherein both the first and second spools are positioned at a first end portion of the shift valve means, the second position wherein both the first and second spools are positioned at a second end portion of the shift valve means, and the third position wherein the first spool and second spool is positioned away from each other. The first, second and third positions of the spools establishes the converter, lock-up and slip conditions respectively in accordance with the first, second and third pressure introduced to the shift valve means. In the slip condition, the releasing pressure is changed continuously as the control hydraulic pressure introduced into the adjusting valve means is changed so that an engaging force of the lock-up clutch is continuously changed. According to the present invention, an abrupt change in the driving hydraulic pressure is suppressed irrespective of the switching action of the position of the spools. Consequently, the engaging force of the lock-up clutch can be smoothly changed.

BRIEF DESCRIPTION OF DRAWINGS

FIG. 12 is a schematic view of a hydraulic circuit for an automatic transmission according to still another embodiment of the present invention;

DESCRIPTION OF THE PREFERRED EMBODIMENTS

Hereinafter, there will be described several preferred embodiments.

Structure of Transmission

Figure 1:
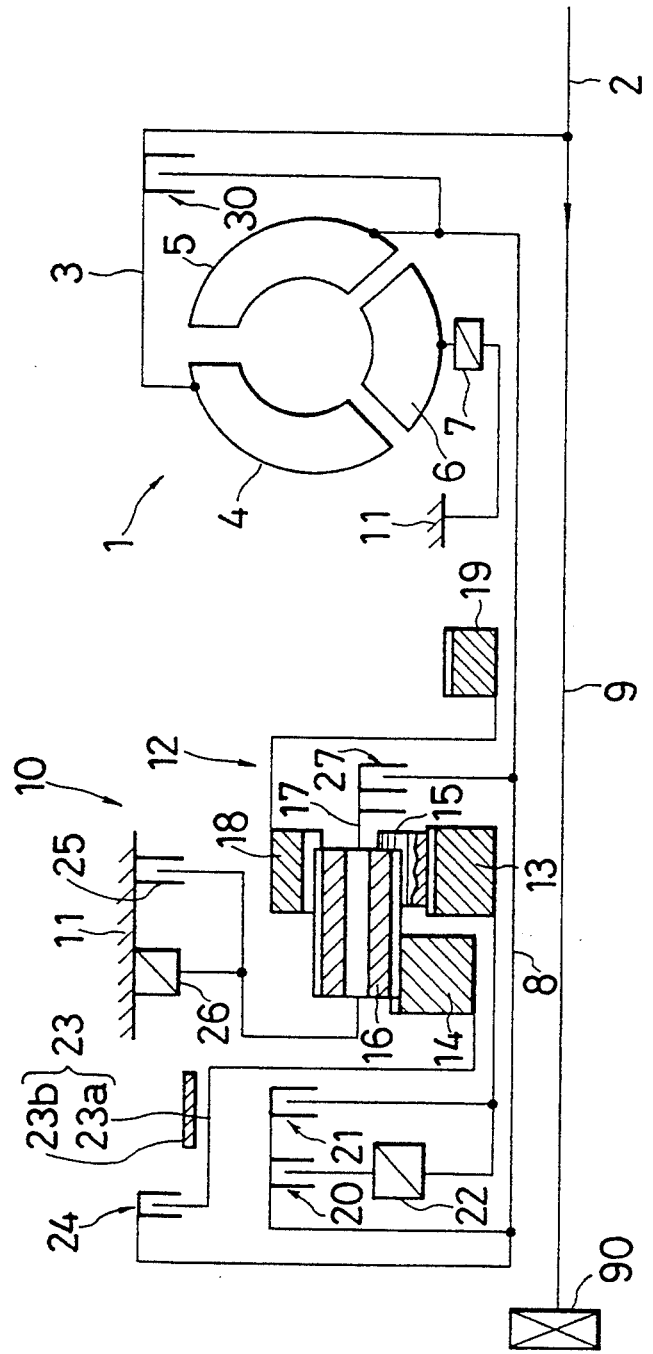
FIG. 1 is a schematic view of an automatic transmission to which a control system in accordance with the present invention can be applied.

Referring specifically to FIG. 1, there is shown a schematic view of an automatic transmission. The automatic transmission includes a torque converter 1 and a multiple stage transmission gear mechanism 10 for establishing selectively a shift gear stage among plural stages of different speed ratios.

The torque converter 1 is provided with a pump 4 on a case 3 connected with an engine output shaft 2, a turbine 5 disposed facing the pump 4 and driven by the pump 4 through a hydraulic fluid, and a stator 6 disposed between the pump 4 and the turbine 5 and supported by a transmission casing 11 through one-way clutch 7 for making a torque amplifying operation. Rotation of the turbine 5 is transmitted to the gear mechanism 10 through a turbine shaft 8. The torque converter 1 is further provided with a lock-up clutch 30 for engaging directly an input member with an output member of the torque converter 1. With the engine output shaft 2 is connected a shaft 9 passing through the turbine shaft 8. The shaft 9 drives an oil pump 90 disposed at a rear end portion of the transmission.

The gear mechanism 10 includes a Ravigneaux-type planetary gear mechanism 12 having a small sun gear 13 movably mounted on the turbine shaft 8, a large sun gear 14 disposed rearward of the small sun gear 13 and movably mounted on the turbine shaft 8, a plurality of short pinion gears 15 meshed with the small sun gear 13, a long pinion gear 16 meshed with the short pinion gears 15 at a front portion and with the large sun gear 14 at a rear end portion thereof, a carrier 17 rotatably carrying the short and long pinion gears 15 and 16, and a ring gear 18 meshed with the long pinion gear 16.

Between the turbine shaft 8 and the small sun gear 13 is disposed a forward clutch 20 for controlling a torque transmission to the small sun gear 13 through a first one-way clutch 22 and a coast clutch 21 for controlling the torque transmission between the turbine shaft 8 and the small sun gear 13 in a juxtaposed relationship. A 2-4 brake 23 having a brake drum 23a connected with the large sun gear 14 and a brake band 23b engaged with the brake drum 23a is disposed radially outward of the coast clutch 21. When the 2-4 brake is engaged, the large sun gear 14 is fixed. A reverse clutch 24 for making a reverse running is disposed adjacent to the 2-4 brake to control the torque transmission between the large sun gear 14 and the turbine shaft 8 through the brake drum 23a. Between the carrier 17 and the transmission casing 11 are disposed a second one-way clutch 26 and a low & reverse brake 25 for engaging and disengaging the carrier 14 and the transmission casing 11 in a juxtaposed relationship. Between the carrier 17 and the turbine shaft 8 is disposed a 3-4 clutch for controlling the torque transmission between the carrier 17 and the turbine shaft 8.

In the illustrated embodiment, the gear mechanism 10 is provided with four shift gear stages in the forward direction and one shift gear stage in the reverse direction and selectively establishes one of the shift gear stages through operations of the clutches 20, 21, 24, 27 and brakes 23 and 25.

Table 1 shows a relationship between the respective gear stages and operations of the frictional elements 20–27. In the table 1, (0) means that the corresponding element transmits the torque when it is used as a driving element.

TABLE 1

| RANGE | | CLUTCH 24 | 20 | 21 | 27 | BRAKE 25 | 23 | ONE-WAY CLUTCH 26 | 22 |
|---|---|---|---|---|---|---|---|---|---|
| P | | | | | | | | | |
| R | | O | | | | O | | | |
| N | | | | | | | | | |
| D | 1 | | O | | | | | (O) | (O) |
|   | 2 | | O | | | | O | | (O) |
|   | 3 | | O | | O | | | | (O) |
|   | 4 | | | | O | | O | | |
| 2 | 1 | | O | | | | | (O) | (O) |
|   | 2 | | O | O | | | O | | (O) |
|   | 3 | | O | O | O | | | | (O) |
| 1 | 1 | | O | O | | O | | | (O) |
|   | 2 | | O | O | | | O | | (O) |

Hydraulic Circuit for Lock-up Clutch

Figure 2:
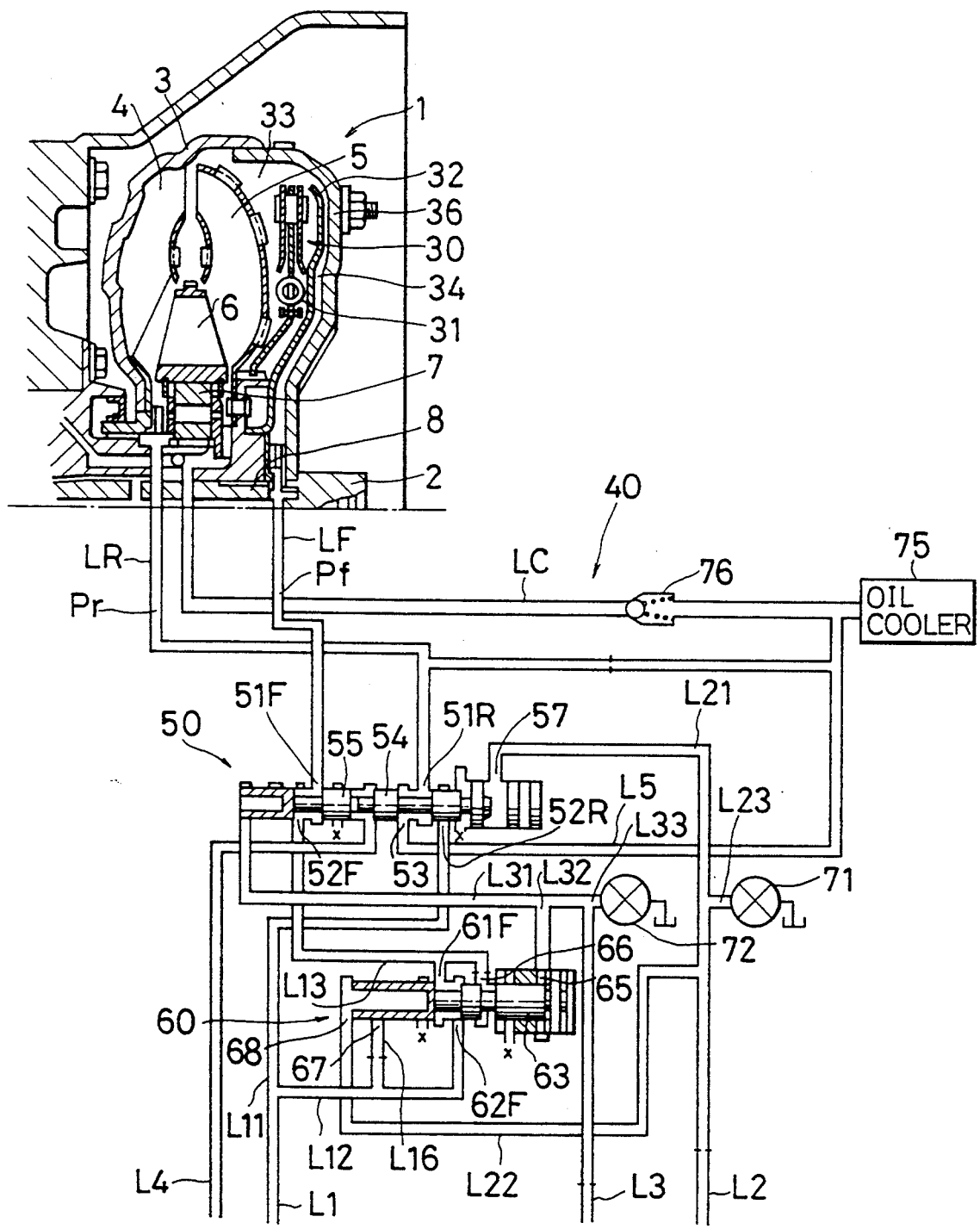
FIG. 2 is a hydraulic control circuit incorporated into the automatic transmission of FIG. 1 for controlling a lock-up clutch.

Referring to FIG. 2, the lock-up clutch 30 of the torque converter 1 is provided with a torsion damper 31 and a damper piston 32 disposed between the turbine 5 and a converter cover 36 connected with the engine output shaft 2 for rotating integrally with the turbine shaft 8. A frictional plate (not shown) is provided on the converter cover 36 facing the damper piston 32. The damper piston 32 divides a space formed in the converter cover 36 into a R-chamber 33 adjacent to the turbine 5 and a F-chamber 34 adjacent to the converter cover 36. A hydraulic pressure Pr introduced into the R-chamber 33 as an engaging pressure urges the damper piston 32 toward the frictional plate of the converter cover 36 to engage the lock-up clutch 30. A hydraulic pressure Pf introduced into the F-chamber 34 as a releasing pressure urges the damper piston 32 away from the frictional plate of the converter cover 36 to disengage the lock-up clutch 30. Thus, an engaging force of the lock-up clutch 30 is determined based on a pressure difference of the hydraulic pressure between the R-chamber and F-chamber. The torque converter 1 selectively takes a converter condition in which the engine torque is transmitted hydraulically to the gear mechanism 10 through only the torque converter 1, a lock-up condition in which the engine torque is transmitted mechanically to the gear mechanism 10 through only the lock-up clutch 30, and a slip condition in which the engine torque is transmitted hydraulically and mechanically through both the torque converter 1 and the lock-up clutch 30.

A hydraulic control circuit 40 for the lock-up clutch 30 is provided with a lock-up shift valve 50 which takes three different positions corresponding to the converter, lock-up and slip conditions, adjusting valve 60 for controlling the hydraulic pressure Pf introduced into the F-chamber through the shift valve 50, an on-off solenoid valve 71 for making on-off operation of introduction of a first pilot pressure Ps for the shift valve 50, and a duty solenoid valve 72 for making a duty control to change a second pilot pressure Pd for the shift valve 50 and the adjusting valve 60.

The hydraulic circuit 40 is formed with a torque converter line L1 into which a hydraulic pressure produced in an oil pump 90 is introduced as a line pressure after being regulated by a pressure regulator (not shown), a first pilot line L2 for supplying the first pilot pressure Ps, a second pilot line L3 for supplying the second pilot pressure Pd, a line L4 for supplying a predetermined hydraulic pressure Pc(for instance 4 kg/cm$^2$), a line LR communicating a port 51R of the shift valve 50 with the R-chamber 33, a line LF communicating a port 51F of the shift valve 50 with the F-chamber 34. The line L1 is divided into a line L11 communicating with a port 52R of the shift valve 50 and a line L12 communicating with a port 62F of the adjusting valve 60. A port 61F of the adjusting valve 60 is communicated with a port 52F of the shift valve 50 through a line L13. A line L5 communicates a port 53 of the shift valve 50 with an oil cooler 75.

The first pilot line L2 is divided into a line L21 communicating with a port 57 of the shift valve 50 and a line L22 communicating with a port 68 of the adjusting valve 60. The on-off solenoid valve 71 is disposed on a drain line L23 of the line L2 so that the drain line L23 is closed at off condition of the solenoid valve 71. When the solenoid valve 71 is turned on, the line L23 is opened to drain hydraulic fluid in the line L2. The second pilot line L3 is divided into a line L31 communicating with a port 58 of the shift valve 50 and a line L32 communicating with a port 65 of the adjusting valve 60. The duty solenoid valve 72 is disposed on a drain line L33 of the second pilot line L3. When the duty solenoid valve is off or when a duty ratio therefor is zero, the drain line L33 is closed. When the solenoid valve 72 is on or when the duty ratio therefor is a value other than zero, the hydraulic fluid in the line L3 is drained. The second pilot pressure Pd is reduced as the duty ratio is increased.

A line LC introduces the hydraulic fluid into the oil cooler 75 through a check valve 76 which is opened when a 25 hydraulic pressure is increased beyond a predetermined value.

Structures of The Shift Valve and Adjusting Valve

Referring to FIGS. 2–5, the shift valve 50 is provided with a first spool 54 (right) and a second spool 55 (left) disposed in series in a sleeve thereof. A spring 56 is disposed leftward of the spool 55 and another spring 56a is disposed between the spools 54 and 55. The first pilot pressure Ps acts on a right end of the first spool 54 through the first pilot line L2, line L21 and the port 57. The second pilot pressure Pd acts on a left end of the second spool 55 through the second pilot line L3, the line L31 and the port 58. The right end of the first spool 54 is enlarged to provide a greater pressure area than the left end of the second spool 55. The predetermined pressure Pc is introduced between the first and second spools 54 and 55 through a port 59 and the line L4.

Figure 3:
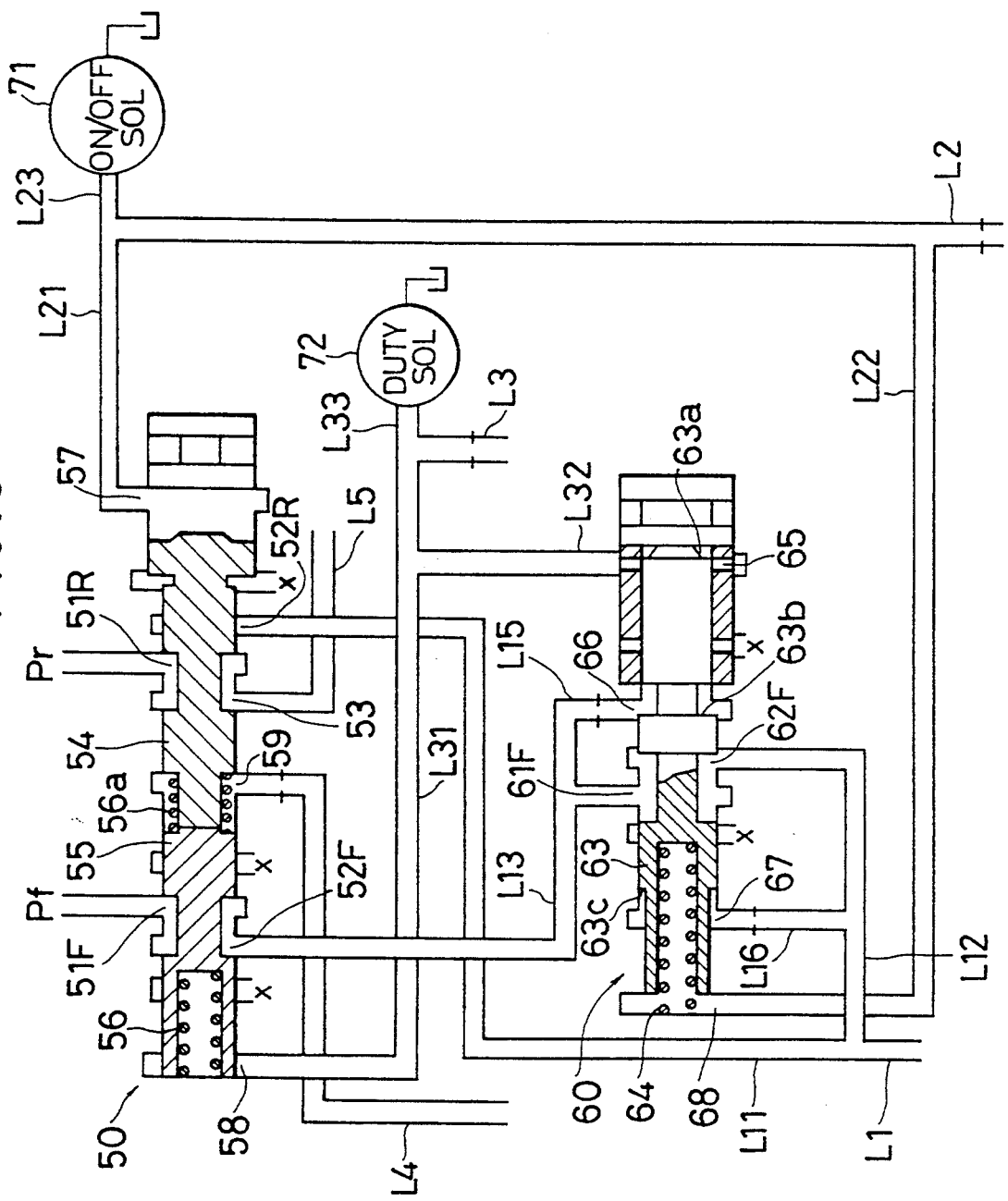
FIG. 3–FIG. 5 show various conditions in operation of the hydraulic circuit.
Figure 4:
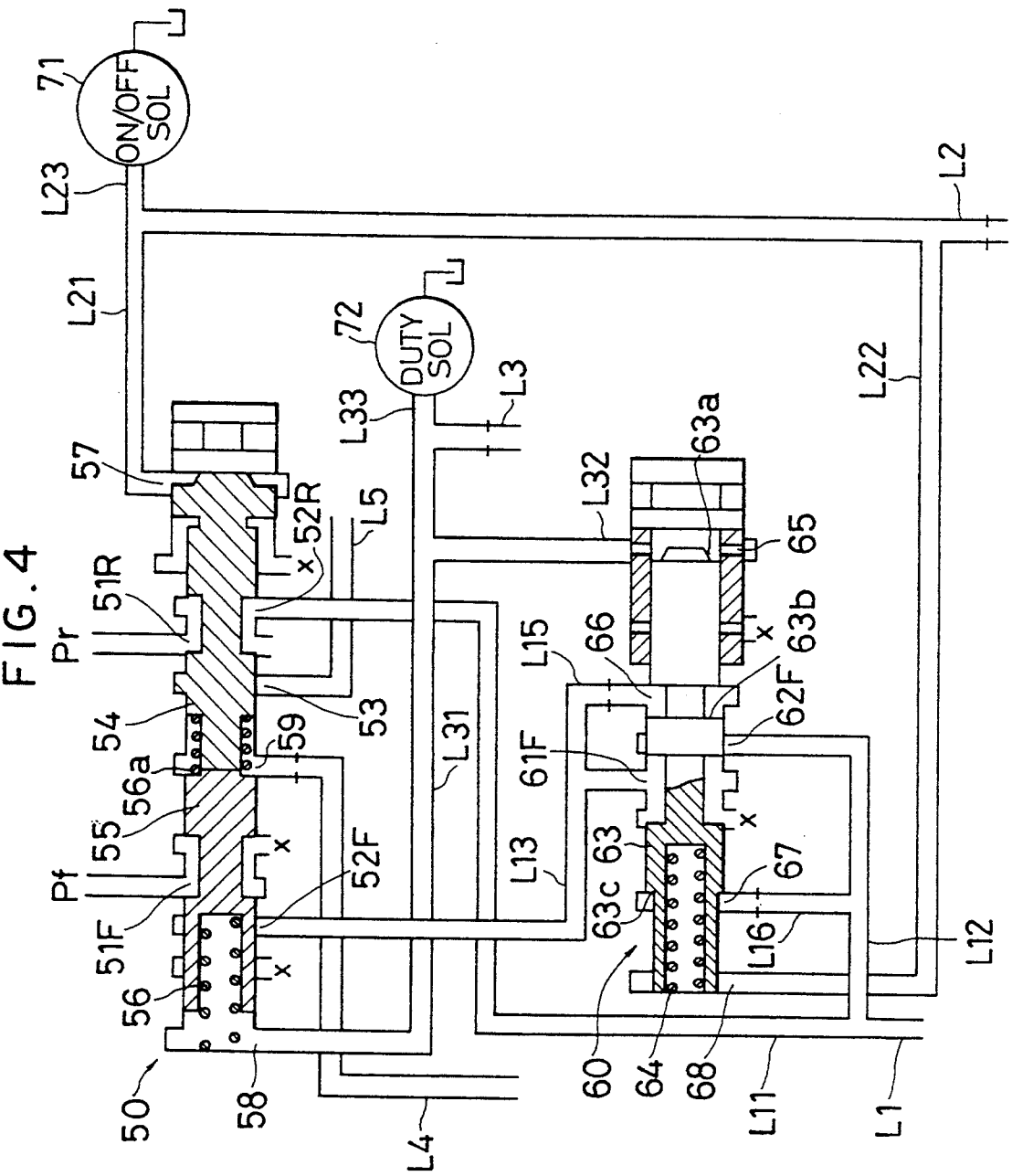
Figure 5:
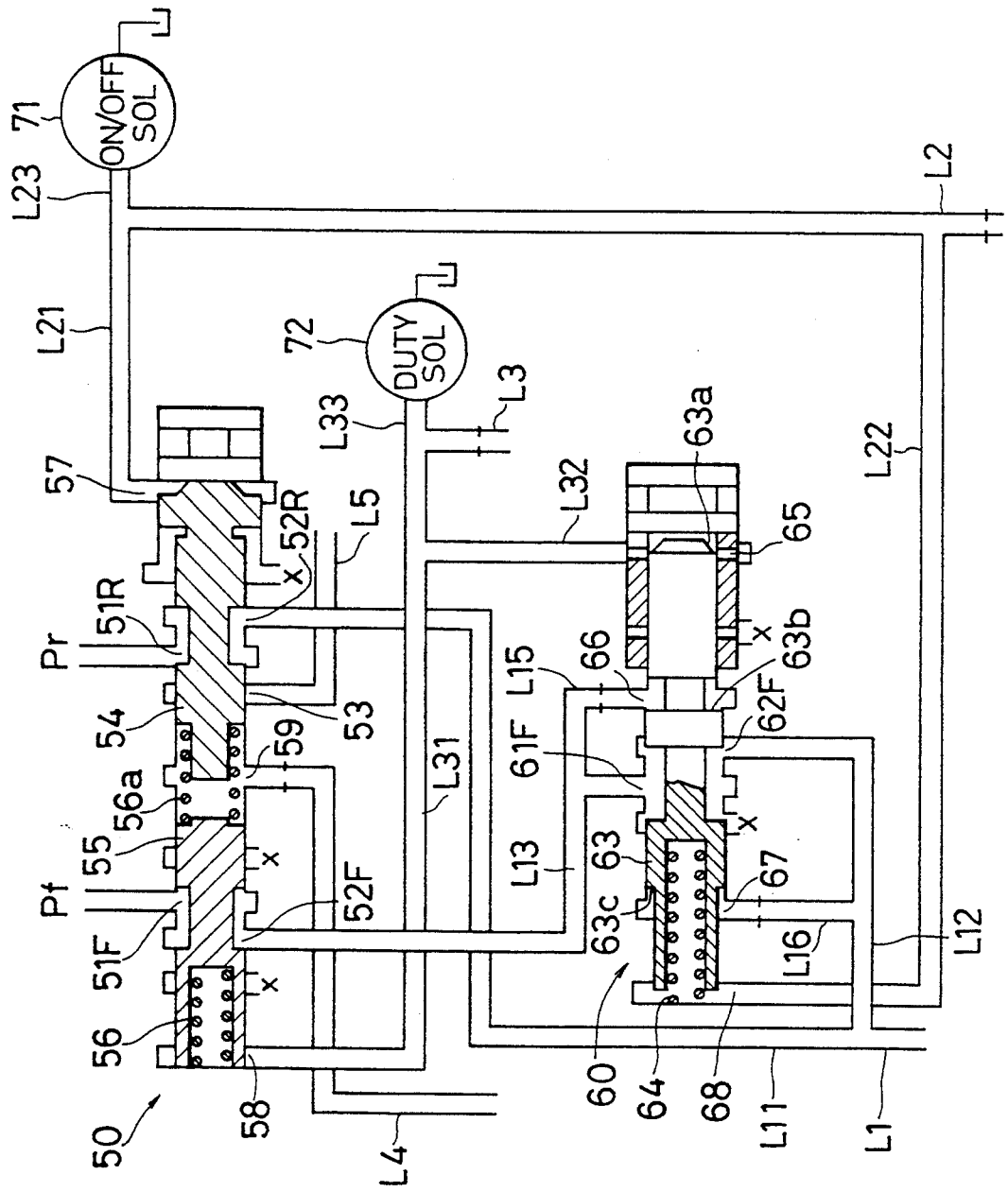

When the solenoid valve 71 is off, the first pilot pressure Ps is high so that the shift valve 50 takes a first position wherein the first and second spools 54 and 55 are offset together toward the leftside of the sleeve of the shift valve as shown in FIG. 3. With the first position of the shift valve 50, the port 51R is communicated with the port 53 and the port 51F is communicated with the port 52F. On the other hand, when the solenoid valve 71 is on and the duty ratio for the solenoid valve 72 is at a small value such as zero %, the first pilot pressure Ps is low whereas the second pilot pressure Pd takes a relatively high value so that the shift valve 50 takes a second position in which the first and second spools 54 and 55 are offset at the right end of the sleeve of the shift valve 50 as shown in FIG. 4. With the second position, the port 51R is communicated with the port 52R and the port 51F is communicated with a drain port. When the solenoid valve 71 is on and when the duty ratio of the solenoid valve 72 is set at a value greater than 20%, the second pilot pressure Pd is relatively small so that the spool 54 and the spool 55 are moved away from each other and offset toward the opposite ends of the sleeve of the shift valve 50 by virtue of the hydraulic pressure Pc introduced into the port 59. That is, the first spool 54 is positioned at the right end and the second spool 55 is positioned at the left end to establish a third position as shown in FIG. 5. In the third position, the port 51R is communicated with the port 52R and the port 51F is communicated with the port 52F.

The adjusting valve 60 is provided with a spool 63 in a sleeve thereof. The spool 63 is urged rightward by a spring 64 as illustrated in the drawings. The hydraulic pressure Pd acts on a right end of the spool 63a as a pilot pressure through the second pilot line L3, line L32 and port 65. The spool 63 is formed with an intermediate land portion of which right stepped portion 63b is subjected to a hydraulic pressure in the Line L13 through a line L15 with an orifice and a port 66. The spool 63 is also formed with a left land portion of which the left stepped portion 63c is subjected to the torque converter pressure of the line L12 through a line L16 with an orifice and port 67. Left end surface of the spool 63 is subjected to the first pilot pressure Ps in the first pilot line L2 through a line L22 and port 68.

When the solenoid 71 is off, the spool 63 is positioned at a right end of the sleeve of the adjusting valve 60 by virtue of the first pilot pressure Ps acting on the left end surface thereof so that the port 61F is communicated with the port 62F. When the solenoid 71 is on, that is, when the first pilot pressure Ps is zero, the spool 63 is moved to a position where the second pilot pressure Pd acting on the right end surface and the hydraulic pressure acting on the stepped portion 63b leftwardly are balanced with the hydraulic pressure acting on the stepped portion 63c and a resilient force of the spring 64 rightwardly. When the second pilot pressure Pd is increased, the spool 63 is moved leftwardly to increase the communication between the port 61F to the line 13 and the drain port. On the other hand, when the second pilot pressure Pd is reduced, the spool 63 is moved rightwardly to increase the communication between the port 61F and the port 62F to thereby increase the releasing pressure Pf. It will be understood that the releasing pressure Pf is reduced as the second pilot pressure Pd is increased.

Operation of the Lock-up Clutch

What is selected among the converter condition, lock-up condition and slip conditions is determined in accordance with a driving condition, such as throttle opening, vehicle speed in light of a map (not shown) by means of a control unit (not shown).

After determination of the condition to be established, the control unit produces the on-off signal to the solenoid valve 71 and the duty ratio signal to the solenoid valve 72 to operate the shift valve 50 and the adjusting valve 60 to establish a desired condition of the torque converter 1.

Figure 6:
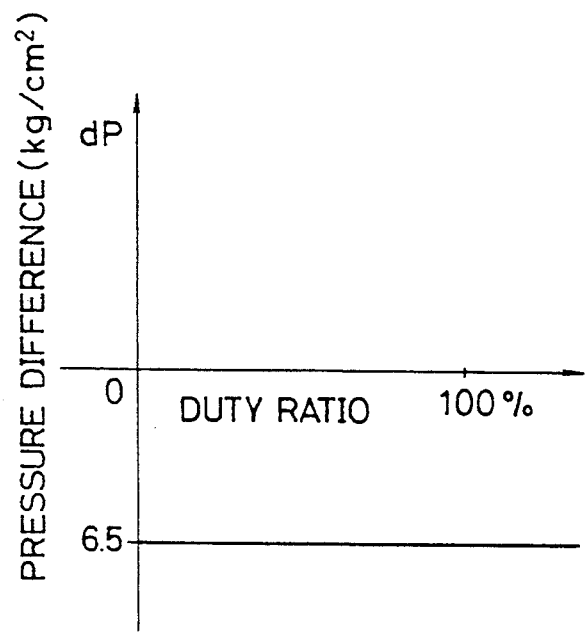
FIG. 6 is a graphical representation showing hydraulic pressure difference between two chambers of a torque converter.
Figure 7:
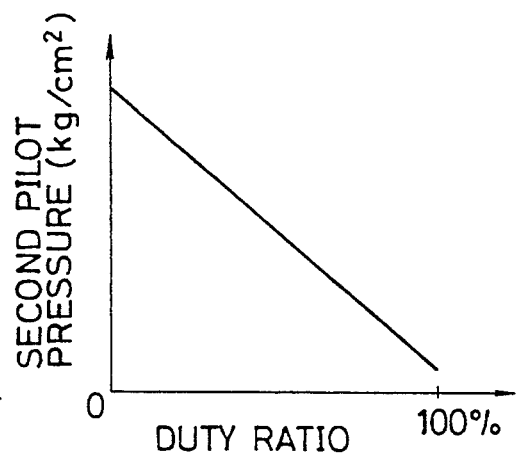
FIG. 7 is a graphical representation showing a relationship a second pilot pressure and a duty ratio of a solenoid valve.

When the converter condition is established, the solenoid valve 71 is off and the duty ratio of the solenoid valve 72 is constant such as 0%. Thus, the shift valve 50 takes the first position as shown in FIG. 3 wherein the port 51R is communicated with the port 53 so that the hydraulic fluid in the R-chamber 33 is introduced into the oil cooler 75 through the lines LR and L5. Concurrently, the port 51F is communicated with the port 52F so that the hydraulic fluid is introduced into the F-chamber 34 through the converter line L1 and the adjusting valve 60, and the line L13. Thus, the lock-up clutch 30 is disengaged because the engaging pressure Pr in the R-chamber 33 is much smaller than the releasing pressure Pf so that the converter condition is established. When the first pilot pressure Ps is introduced into the left port 68 of the adjusting valve 60 in the case where the solenoid valve 71 is off, the port 61F is freely communicated with the port 62F of the adjusting valve 60 so that the adjusting valve 60 allows a hydraulic pressure corresponding to a line pressure of a constant value, such as 6.5 kg/cm² to be introduced into the F-chamber 34. In this case, the pressure difference dP as an engaging pressure between the pressures Pr and Pf is maintained at a constant negative value as shown in FIG. 6 so as to establish the converter condition. With this structure, even when the solenoid valves 71 and 72 are isolated, the converter condition is established to provide a fail-safe function in a specific condition such as a starting condition in which a greater torque is needed.

When the lock-up condition is required, the solenoid valve 71 is turned on whereas the duty ratio of the solenoid valve 72 is maintained at the constant value (0%). Thus, the shift valve takes the second position as shown in FIG. 4 so that the port 51R is communicated with the port 52R. As a result, the hydraulic fluid is introduced into the R-chamber 33 through the lines L11 and LR from the line L1. Concurrently, the port 51F is communicated with the drain port so that the hydraulic fluid in the F-chamber 34 is drained. Thus, the pressure difference dP between the R-chamber and F-chamber is a constant value corresponding to the line pressure so that the lock-up clutch 30 is fully engaged to established the lock-up condition.

When the lock-up condition is changed to the slip condition, the solenoid valve 71 is kept on while the duty ratio of the solenoid valve 72 is increased to a value more than 20%. As e result, the shift valve 50 takes the third position as shown in FIG. 5 so that the port 51R is communicated with the port 52R to allow the hydraulic pressure Pr to be introduced into the R-chamber 33 and the port 51F is communicated with the port 52F to allow the hydraulic pressure Pf to be introduced into the F-chamber 34. In this case, the value of the hydraulic pressure Pf is controlled by means of the adjusting valve 60 which is controlled in accordance with the duty ratio of the solenoid valve 72. At the time of the shift action of the first spool 54 and second spool 55 in the shift valve 50 from the second position to third position, the releasing pressure Pf is relatively low. Thereafter, the pressure Pf is gradually increased as the duty ratio is increased. The pressure difference dP between the R-chamber 33 and the F-chamber 34 is controlled through the duty control for the solenoid valve 72 to change the engaging force of the lock-up clutch 30 in the illustrated slip control.

Figure 8:
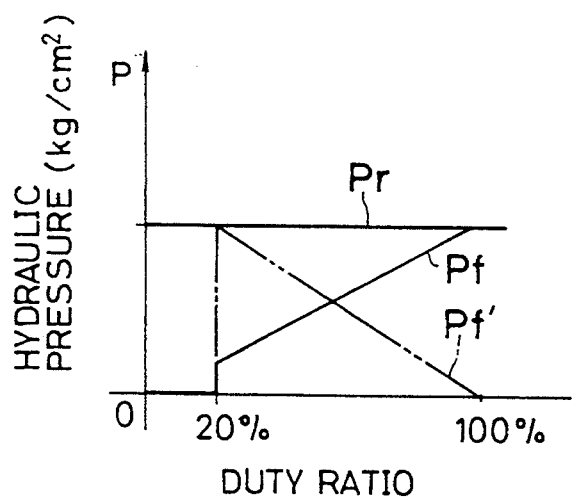
FIG. 8 is a graphical representation showing a releasing pressure and an engaging pressure.

Conventionally, the releasing pressure Pf' is increased as shown by a phantom line in FIG. 8. By contrast, in the illustrated embodiment, the hydraulic pressure Pf in the line L13 is reduced as the second pilot pressure Pd is increased shown by a real line in FIG. 8.. Thus, in the conventional control, when the duty ratio of the solenoid valve 72 is in a range of 20%-80%, the releasing pressure Pf' is increased as the duty ratio is reduced. As aforementioned, when the duty ratio is reduced below 20%, the second spool 55 is moved rightwardly in FIG. 5 because of the increase of the second pilot pressure Pd so that the .shift valve 50 is shifted to take the second position as shown in FIG. 4. Therefore, the hydraulic pressure in the F-chamber would be abruptly changed around a duty ratio of 20%. This would cause an abrupt change in the engaging force of the lock-up clutch 30.

To the contrary, according to the illustrated embodiment, the hydraulic pressure Pf in the line L13 is controlled to be decreased as the second pilot pressure Pd is increased. Thus, the hydraulic pressure Pf in the F-chamber 34 is changed in accordance with the duty ratio as shown by the real line in FIG. 8. It will be understood that the releasing pressure Pf does not make an abrupt change around the duty ratio 20% irrespective of the switching operation from the third position to the second position in the shift valve 50 and thus changes continuously. As a result, the pressure difference dP changes continuously in accordance with the change of the duty ratio which causes a mode change between the slip condition and the lock-up condition to accomplish a smooth change in the engaging force of the lock-up clutch 30. This prevents an abrupt raising in engine speed at the time of the mode change.

Figure 9:
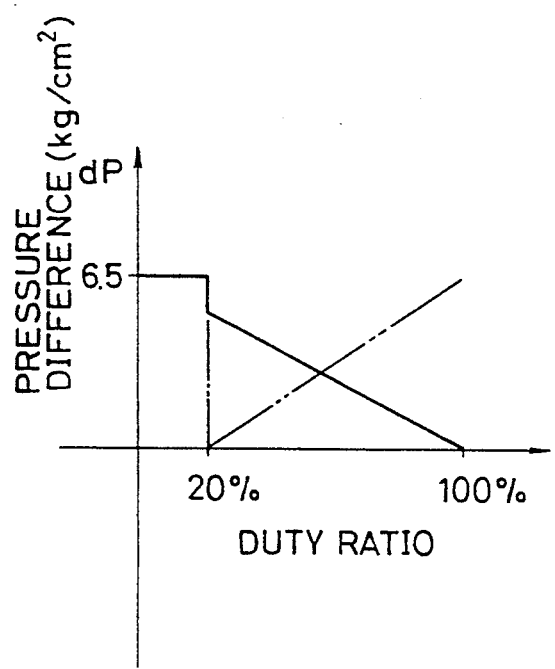
FIG. 9 is a graphical representation showing a pressure difference and the duty ratio.

The mode change between the converter condition and the lock-up condition may be made though the slip condition to suppress an abrupt change in the engaging force of the lock-up clutch 30 for thereby obviating a torque shock taking advantage of the above duty control as shown by the real lines in FIGS. 8 and 9.

Hereinafter, there is described another embodiment of the present invention.

Figure 10:
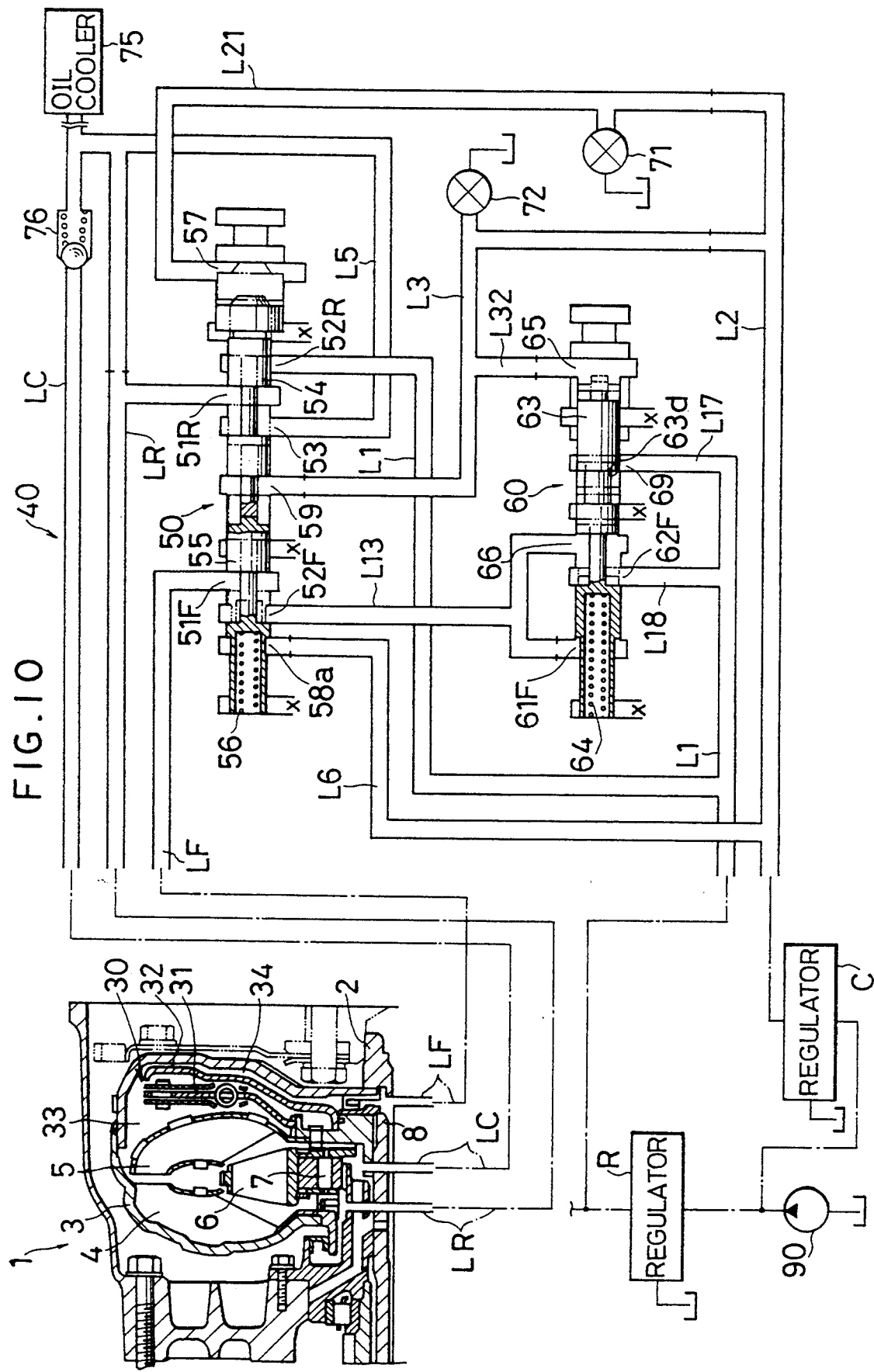
FIG. 10 is a schematic view of a hydraulic control circuit similar to FIG. 2 but showing another embodiment.

Referring to FIG. 10, there is shown a hydraulic control circuit 40 for this illustrated embodiment. The same elements as are present in the former embodiment are designated by the same reference numbers and explanations of these elements will be omitted. In the illustrated embodiment, the hydraulic pressure produced in the oil pump is introduced into the port 52R of the shift valve 50 through the line L1 and a port 69 of and the port 62F of the adjusting valve 60 through a line L17 and a line L18 as the line pressure after being regulated by a pressure regulator R. The hydraulic pressure produced in the oil pump 90 is introduced into the shift valve 50 through a line L6 and a port 58a, though the lines L2, L3 and the port 59 and through the lines L2, L21 and the port 57, and into the adjusting valve 60 through the lines L2, L3, L32 and the port 65 as a control pressure after being regulated by a regulator C which makes a substantially constant pressure. Thus, the first pilot pressure Ps acting on the right end surface of the first spool 54 of the shift valve 50 is introduced into the port 57 through the line 21 and can be controlled by the solenoid valve 71. The second pilot pressure Pd is introduced directly into the port 58a through the line L6 separated from the line L2 just downstream of the regulator C and acting on the left end surface of the second spool 55 of the shift valve 50. The third pilot pressure Pc acting between the first and second spools 54 and 55 is introduced into the port 59 through the line L3 separated from the line L2 and can be controlled by the duty solenoid valve 72. The port 65 of the adjusting valve 60 is communicated with the line L3 through the line L32 so that the third pilot pressure Pc also acts on the right end surface 63a of the spool 63 of the adjusting valve 60. The line pressure introduced into the port 63 through the line L17 acts on a stepped portion 63d of the spool 63 in opposition-to the third pilot pressure Pc.

The line pressure from the regulator valve R is introduced into the F-chamber 34 through the line L1, line L18, port 62F, port 66, line L13, port 52F, port 51F and line LF as the releasing pressure Pf and can be changed by controlling the communication between the port 62F and the port 66 of the adjusting valve 60. The line pressure is introduced into the R-chamber 33 as the engaging pressure Pr through the line L1, port 52R, port 51R and the line LR.

In operation, in the converter condition, the solenoid valve 71 is off so as to be closed and the solenoid valve 72 receives a duty ratio smaller than 20% to be substantially closed as well so that the control pressure regulated by the regulator C is introduced into the port 57 through the line L21 as the first pilot pressure Ps with a relatively high value. Concurrently, the control pressure is introduced into the port 59 of the shift valve 50 as the third pilot pressure Pc through the line L3 and into-the port 65 of the adjusting valve 60. The control pressure is also normally introduced into the port 58a of the shift valve 50 through the line L6 as the second pilot pressure Pd. Since the pressure area of the right end surface of the first spool 54 on which the first pilot pressure Ps acts through the port 57 is greater than the left end surface of the second spool 55 on which the second pilot pressure Pd acts through the port 58a, the spools 54 and 55 are positioned at the left end of the sleeve of the shift valve 50 in opposition to the resilient force of the spring 56 and reacting rightward forces acting on the spools 54 and 55 by virtue of the hydraulic pressure as shown by the real line in FIG. 10 to establish the first position of the shift valve 50. In the first position of the shift valve 50, the port 52F is communicated with the port 51F so that the line pressure is introduced into the F-chamber 34 as the releasing pressure Pf. On the other hand, the port 53 is communicated with the port 51R so that the hydraulic pressure in the R-chamber is reduced through the line L5. In the adjusting valve 60, the control pressure introduced into the port 65 to act on the right end surface 63a of the spool 63 causes the spool 63 to be offset at the left end of the sleeve in opposition to the resilient force of the spring 64 and the line pressure acting on the stepped portion 63d as shown by the real line in FIG. 10. As a result, the port 62F is fully communicated with the port 66 so that the line pressure is introduced into the F-chamber 34 without producing significant pressure drop. Thus, the pressure difference dP between the F-chamber (Pf) and the R-chamber (Pr) is increased to establish the converter condition.

In the slip condition, the solenoid valve 71 is on to be opened and the duty solenoid valve 72 receives a duty signal which ranges from about 20% to 80% so that the first pilot pressure Ps acting on the right end surface of the spool 54 is reduced through the port 57 and the hydraulic pressure introduced to the port 59 of the shift valve 50 and to the port 65 of the adjusting valve 60 is also reduced in proportion to an increase of the duty ratio. In this case, the second spool is maintained at the same position as the converter condition whereas the first spool 54 is moved to the right end of the sleeve of the shift valve 50 as shown by a phantom line in FIG. 10 away from the second spool 55 to establish the third position of the shift valve 50 because of the serious reduction of the first pilot pressure Ps. As a result, although the port 52F remains communicated with the port 51F, the port 51R is switched to be communicated with the port 52R from the communication with the port 53. In the adjusting valve 60, the spool 63 is moved rightwardly in accordance with a balance of a rightward force by virtue of the sum of the resilient force of the spring 64 and the hydraulic pressure acting on the stepped portion through the port 69 and a leftward force by virtue of the hydraulic pressure acting on the right end surface of the spool 63 through the port 65 so as to reduce the communication between the port 62F and the port 66. Therefore, the releasing pressure Pf supplied into the F-chamber 34 is reduced as increase of the duty ratio for the solenoid valve 72 whereas the engaging pressure Pr is increased because of the switching action of the communication of the port 51R from the port 53 to the port 52R. As a result, the engaging force of the lock-up clutch 30 is changed depending on the pressure difference dP between the releasing pressure Pf and the engaging pressure Pr. Thus, the lock-up clutch 30 establishes the slip condition wherein the slip rate or speed difference between the input member and output member is controlled to a target value in accordance with the duty ratio for the solenoid valve 72.

In the lock-up condition, the solenoid valve 71 is maintained opened and the solenoid valve 72 receives a duty ratio more than about 80% to be substantially opened so that the hydraulic pressure Ps introduced into the port 57 of the shift valve 50 is low and the hydraulic pressure Pc introduced into the port 59 of the shift valve 54 and into the port 65 of the adjusting valve 60 is also low. Thus, the first and second spools 54 and 55 are offset at the right end of the sleeve of the shift valve 50 as shown by the phantom lines in FIG. 10 because of the second pilot pressure Pd through the line L6 and the port 58a and the resilient force of the spring 56. As a result, the port 52R remains communicated with the port 51R whereas the communication between the port 52F and the port 51F is interrupted. In the adjusting valve 60, the spool 63 is moved-rightward to be positioned at the right end of the sleeve of the adjusting valve 60 as shown by the phantom line in FIG. 10 .because of the resilient force of the spring 64 so that the communication between the port 62F and the port 66 is entirely interrupted. With this position, the line pressure adjusted by the regulator R is introduced into the R-chamber 33 without producing a substantial pressure drop through the line L1, port 52R, port 51R and line LR. Whereas, the port 51F is switched to be communicated with the drain port from the communication with the port 52F so that the hydraulic fluid in the F-chamber 34 is drained. Thus, the engaging pressure Pr in the R-chamber is much greater than the releasing pressure Pf in the F-chamber 34 enough to establish the lock-up condition.

Figure 11:
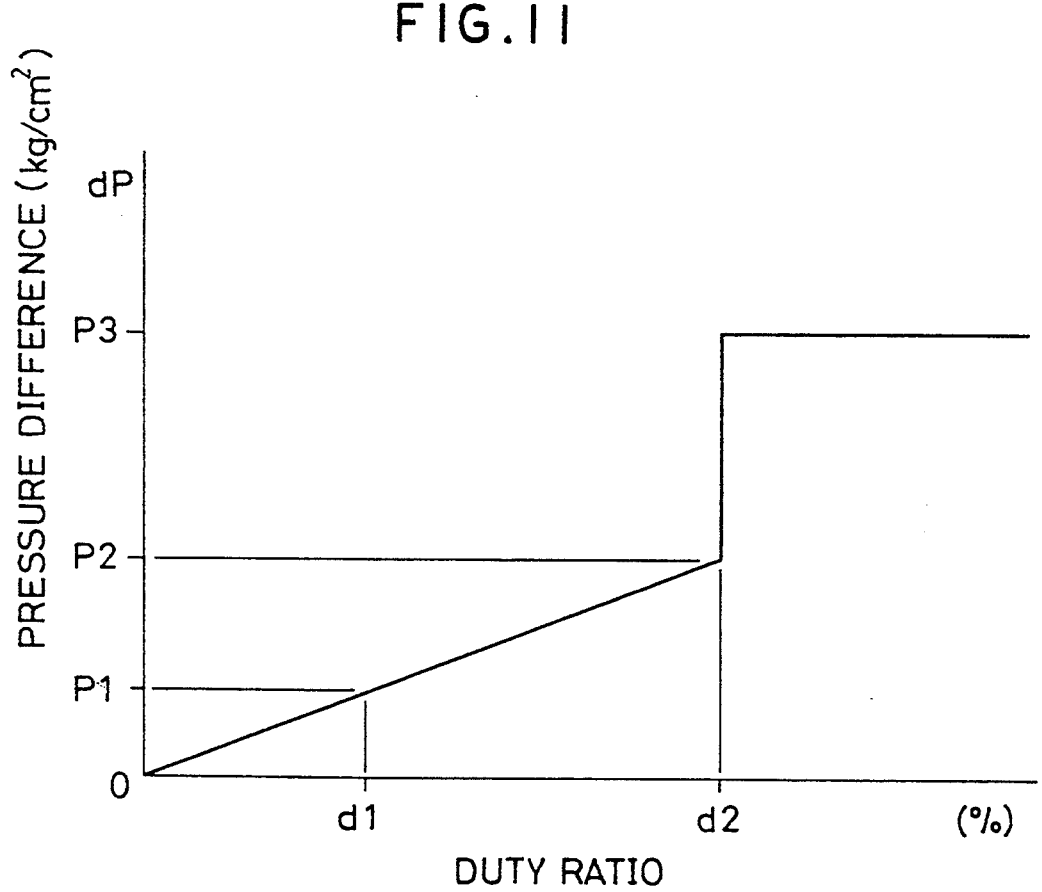
FIG. 11 is a graphical representation of a relationship between the pressure difference and the duty ratio.

According to the illustrated embodiment, as shown in FIG. 11, the pressure difference dP is increased as the duty ratio for the solenoid valve 72 increases. When the duty ratio takes a value more than d2 (for example 80%), the lock-up condition is established. When the duty ratio takes a value less than d1 (for example 20%), the converter condition is established. When the duty ratio takes a value between d1 and d2, the slip condition is established wherein the slip ratio is decreased as the duty ratio is increased. According to the illustrated control system, the switching action of the hydraulic fluid to and from the F-chamber is carried out in the shift valve 50 to change the mode between the lock-up condition and the slip condition when the releasing pressure Pf is low because of the limited communication between the port 62F and the port 66 of the adjusting valve 60. Therefore, the mode change can be smoothly made while suppressing an abrupt change in the releasing pressure Pf in the F-chamber. Thus, the abrupt change in the engaging force of the lock-up clutch 30 is also prevented.

Hereinafter, there will be described still another embodiment of the present invention making reference to FIGS. 12–15.

The illustrated structure of the transmission and the hydraulic control circuit is substantially the same as that of the first embodiment explained through FIGS. 1–5. The same reference numbers are employed for the same element appearing therein without a detailed explanation.

The shift valve 50 and the adjusting valve 60 are controlled by an electronic control unit (not shown) through the solenoid valves 71 and 72.

Figure 13:
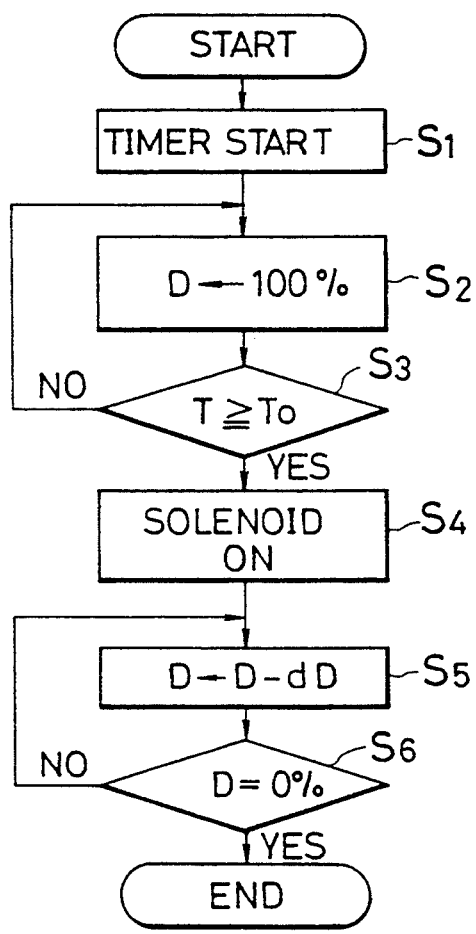
FIG. 13 is a flow chart of a pressure control of the control circuit FIG. 12.
Figure 14:
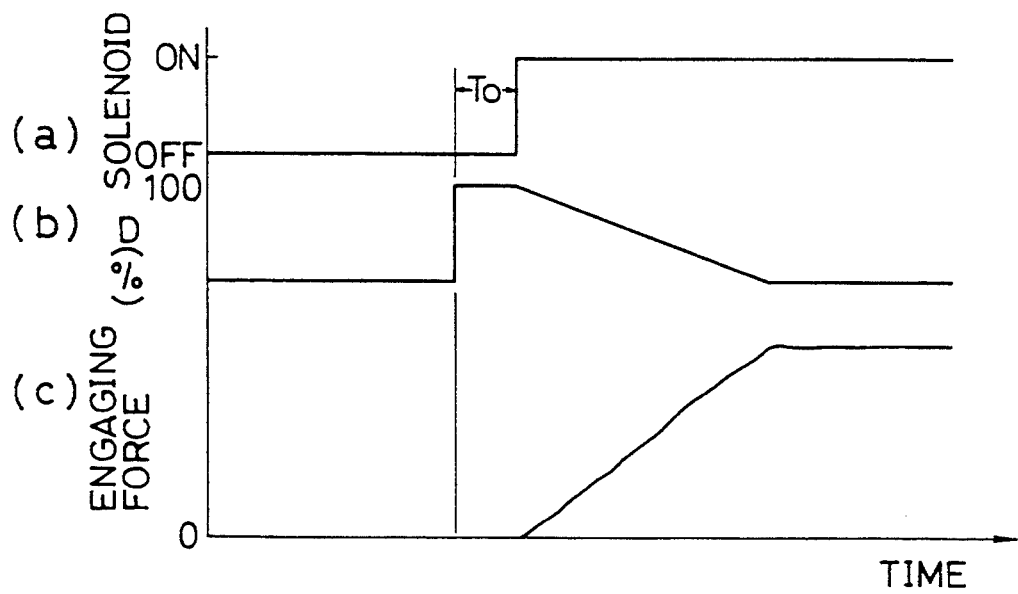
FIG. 14 is a graphical representation showing a relationship of signals for the solenoid valves and the engaging force.

Referring to FIG. 13, there is shown a flow chart of a control in which the mode is to be changed from the converter condition to the lock-up condition through the slip condition. The control unit starts a timer (step S1), sets a duty ratio signal D at a value of 100% for the duty solenoid valve 72 (step S2) and repeats the steps S1 and S2. Through this procedure, the duty solenoid value 72 drains the second pilot line L3 entirely. Thereafter, the control unit judges whether or not a counting value T of the timer reaches a predetermined value T0. When the counting value T reaches the predetermined value T0, step S4 is carried out to turn on the solenoid valve 71 (step S4). The control unit changes the duty ratio D by subtracting a predetermined value dD until the value D reaches zero % (steps S5, S6). Thus, it will be understood that the solenoid 71 is turned on when the predetermined value T0 has passed and thereafter the duty ratio starts to be decreased from the value 100% as shown FIG. 14. The shift valve 50 takes the third position in which the slip condition is established.

Figure 15:
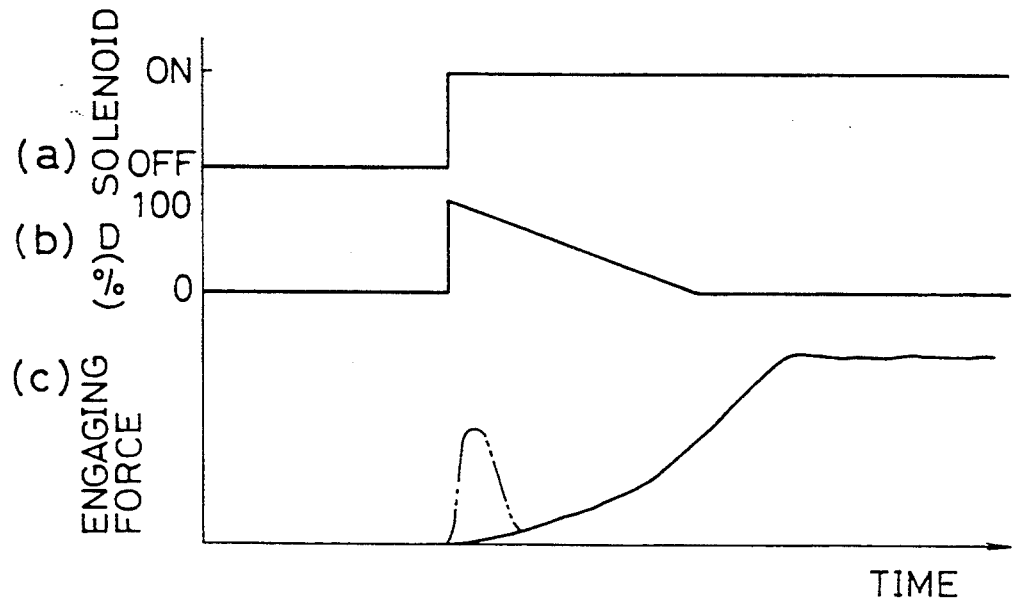
FIG. 15 is a graphical representation similar to FIG. 14 but showing a conventional control.

According to the above control, the actuation of the solenoid valve 71 is deferred by the predetermined value T0 after the duty ratio of 100% is provided for the solenoid valve 72. The pilot line L3 is drained entirely prior to draining the line L2 because of the time lag T0. Therefore, the lock-up condition is prevented from being undesirably established temporarily by virtue of the remaining pressure in the pilot line 3 to produce a temporary soaring of the engaging force when the mode is changed from the converter condition to the slip condition as shown in FIG. 15. As the duty ratio is decreased from 100%, the engaging force of the lock-up clutch 30 is gradually increased. Eventually the lock-up condition is accomplished when the duty ratio is zero.

What is claimed is:

1. A control system for a torque converter comprising:
   lock-up clutch means provided in said torque converter for connecting input and output members of the torque converter directly,
   means for generating a regulated line pressure,
   shift valve means having first and second spools disposed in series in a sleeve for shifting introduction of said regulated line pressure to provide engaging and releasing pressures acting on the lock-up clutch means in accordance with positions of the first and second spools, said first spool being subjected to a first hydraulic pressure at one end thereof so that the engaging pressure is regulated according to introduction of said first hydraulic pressure, said second spool being subjected to a second hydraulic pressure at one end thereof opposite to said one end of the first spool so that the releasing pressure is regulated according to introduction of said second hydraulic pressure, said first and second spools being subjected to a third hydraulic pressure therebetween,
   first control means for controlling said first hydraulic pressure, and
   adjusting valve means for controlling said releasing pressure of the lock-up clutch means, said shift valve means providing the first and second spools with first, second and third positions corresponding to a converter condition, lock-up condition and slip condition, respectively, said adjusting valve means controlling the releasing pressure so that it gradually increases as the second hydraulic pressure decreases during a transition from the lock-up condition to the converter condition, in which the second hydraulic pressure is interrupted and the releasing pressure reaches a value approximately equal to said regulated line pressure.

2. A control system as recited in claim 1 wherein the shift valve means provides the first position, where both the first and second spools are offset at one end of the sleeve, when the first hydraulic pressure is high and the second hydraulic pressure is high, the second position, where both the first and second spools are offset at the other end of the sleeve, when the first hydraulic pressure is low and the second hydraulic pressure is high, and the third position when the first hydraulic pressure is low and the second hydraulic pressure is intermediate.

3. A control system as recited in claim 1 wherein the third hydraulic pressure is constant irrespective of the position of the shift valve means.

4. A control system as recited in claim 1 further comprising second control means for controlling said second hydraulic pressure.

5. A control system as recited in claim 4 wherein the first control means is an on-off solenoid valve for switching the first hydraulic pressure between high and low valves.

6. A control system as recited in claim 5 wherein the first hydraulic pressure is at a high valve when the on-off solenoid valve is off.

7. A control system as recited in claim 5 wherein the second control means is a duty solenoid valve for controlling the second hydraulic pressure continuously.

8. A control system as recited in claim 7 wherein the second hydraulic pressure is increased as a duty ratio for the duty solenoid valve is decreased.

9. A control system as recited in claim 8 wherein the first position of the shift valve means is established when the duty ratio for the duty solenoid valve is smaller than about 20% and the on-off solenoid valve is off.

10. A control system as recited in claim 8 wherein the second position of the shift valve means is established when the duty ratio for the duty solenoid valve is smaller than about 20% and the on-off solenoid valve is on.

11. A control system as recited in claim 8 wherein the third position of the shift valve means is established when the duty ratio for the duty solenoid valve is greater than about 20% and the on-off solenoid valve is on.

12. A control system as recited in claim 8 wherein said adjusting valve means comprises a spool in a sleeve which is moved between opposite ends of the sleeve in accordance with a change in a first control pressure and a second control pressure in opposition to the first control pressure so as to control the releasing pressure.

13. A control system as recited in claim 8 wherein shift action occurs between the second and third positions when the releasing pressure is relatively low, the second hydraulic pressure is relatively high, and the duty ratio of the duty solenoid valve is relatively low.

14. A control system for a torque converter comprising:
   lock-up clutch means provided in said torque converter for connecting input and output members of the torque converter directly;
   shift valve means having first and second spools disposed in series in a sleeve for shifting introduction of engaging and releasing pressures acting on the lock-up clutch means in accordance with positions of the first and second spools,
   said first spool being subjected to a first hydraulic pressure at one end thereof,
   said second spool being subjected to a second hydraulic pressure at one end thereof opposite to said one end of the first spool,
   said first and second spools being subjected to a third hydraulic pressure therebetween;
   an on-off solenoid valve for switching the first hydraulic pressure from high to low and from low to high pressures;
   a duty solenoid valve for controlling said second hydraulic pressure continuously, said second hydraulic pressure being increased as a duty ratio for said duty solenoid valve is decreased; and adjusting valve means for controlling said releasing pressure of the lock-up clutch means, said adjusting valve means comprising a spool in a sleeve which is moved between opposite ends of the sleeve in accordance with a change in a first control pressure and a second control pressure in opposition to the first control pressure so as to control the releasing pressure, said spool being subjected to the second hydraulic pressure as the first control pressure and to the first hydraulic pressure as the second control pressure, said shift valve means providing the first and second spools with first, second and third positions corresponding to a converter condition, a lock-up condition and a slip condition.

15. A control system as recited in claim 14 where the adjusting valve means comprises an input and output ports through which the releasing pressure is introduced into the shift valve means, a communication between the input and output ports being changed in accordance with the movement of the spool to thereby change the releasing pressure continuously.

16. A control system as recited in claim 15 wherein the releasing pressure produced by the adjusting valve means is decreased as the first control pressure is increased.

17. A control system as recited in claim 15 wherein full communication is established between the input and output ports to maximize the releasing pressure when the first control pressure is small.

18. A control system as recited in claim 17 wherein the releasing pressure is decreased as the duty ratio of the duty solenoid valve is decreased when the on-off solenoid valve is on.

19. A control system for a torque converter comprising:

lock-up clutch means provided in said torque converter for connecting input and output members of the torque converter directly;

shift valve means having first and second spools disposed in series in a sleeve for shifting introduction of engaging and releasing pressures acting on the lock-up clutch means in accordance with positions of the first and second spools, said first spool being subjected to a first hydraulic pressure at one end thereof, said second spool being subjected to a second hydraulic pressure at one end thereof opposite to said one end of the first spool, said first and second spools being subjected to a third hydraulic pressure therebetween;

first control means for controlling said first hydraulic pressure;

adjusting valve means for controlling said releasing pressure of the lock-up clutch means, said shift valve means providing the first and second spools with first, second and third positions corresponding to a converter condition, a lock-up condition and a slip condition, respectively; and second control means for controlling said second hydraulic pressure and said third hydraulic pressure.

20. A control system as recited in claim 19 wherein the first control means is an on-off solenoid valve for switching the first hydraulic pressure between high and low values.

21. A control system as recited in claim 20 wherein the first hydraulic pressure is high when the on-off solenoid valve is off.

22. A control system as recited in claim 21 wherein the second control means is a duty solenoid valve for controlling the second hydraulic pressure continuously.

23. A control system as recited in claim 22 wherein the second hydraulic pressure is increased as a duty ratio for the duty solenoid valve is decreased.

24. A control system as recited in claim 23 wherein said adjusting valve means comprises a spool in a sleeve which is moved between opposite ends of the sleeve in accordance with a change in a first control pressure and a second control pressure in opposition to the first control pressure so as to control the releasing pressure.

25. A control system as recited in claim 24 wherein the first control pressure is controlled by the duty solenoid valve.

26. A control system as recited in claim 25 wherein the adjusting valve means comprises input and output ports through which the releasing pressure is introduced into the shift valve means, a communication between the input and output ports being changed in accordance with the movement of the spool to thereby change the releasing pressure continuously.

27. A control system as recited in claim 26 wherein the first control pressure is decreased as the duty ratio is increased so that the communication between the input port and the output port is decreased to reduce the releasing pressure.

28. A control system as recited in claim 19 wherein the second hydraulic pressure is substantially constant.

29. A control system as recited in claim 19 wherein a shift action occurs between the second and third positions when the releasing pressure is relatively low, the third hydraulic pressure is relatively low, and the duty ratio of the duty solenoid valve is relatively high.

* * * * *